No. 817,221.

PATENTED APR. 10, 1906.

E. CAMERON.
WEIGHING MACHINE.
APPLICATION FILED OCT. 26, 1904.

4 SHEETS—SHEET 3.

WITNESSES:
John Holsch
Albert L. Smith

INVENTOR
Ewan Cameron
BY Dyer & Dyer
ATTORNEYS

No. 817,221. PATENTED APR. 10, 1906.
E. CAMERON.
WEIGHING MACHINE.
APPLICATION FILED OCT. 26, 1904.

4 SHEETS—SHEET 4.

WITNESSES:
John Hotsch
Albert L. Smith

INVENTOR
Evan Cameron
BY
ATTORNEYS.

UNITED STATES PATENT OFFICE.

EWAN CAMERON, OF BROOKLYN, NEW YORK, ASSIGNOR TO UNITED STATES RECORDING AUTOMATIC SCALES COMPANY, OF NEW YORK, N. Y., A CORPORATION OF NEW YORK.

WEIGHING-MACHINE.

No. 817,221.

Specification of Letters Patent.

Patented April 10, 1906.

Application filed October 26, 1904. Serial No. 230,003.

*To all whom it may concern:*

Be it known that I, EWAN CAMERON, a citizen of the United States, and a resident of Brooklyn, county of Kings, State of New York, have invented a certain new and useful Improvement in Weighing-Machines, of which the following is a specification.

This invention relates to improvements in machines for weighing materials in bulk of the kind which comprises a receptacle which is alternately filled and emptied and indicates upon a register the number of times it has been filled with a definite weight of material, such a form of machine being illustrated in my Patent No. 697,196, dated April 8, 1902.

The objects of the invention are to provide a device which will handle a large quantity of material in a minimum of time and which will be very accurate in its operations.

Another object is to provide a device which may be adjusted for wear, so that it will always operate with great accuracy.

Still another object is to simplify the construction and increase the efficiency of the device, as will more fully appear from the specification and claims.

I attain these objects by the mechanism illustrated in the accompanying drawings, in which—

Figure 1:
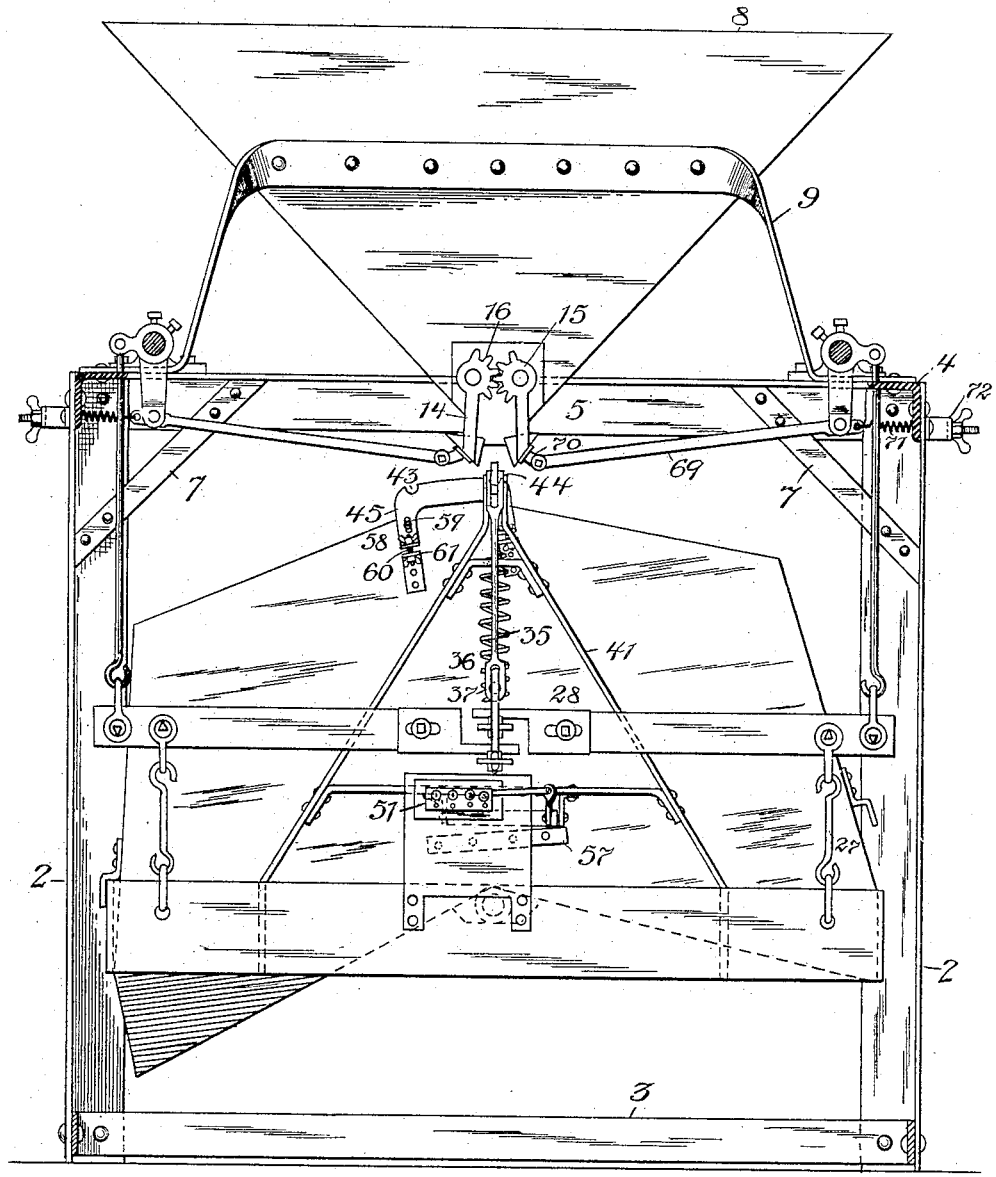
Figure 2:
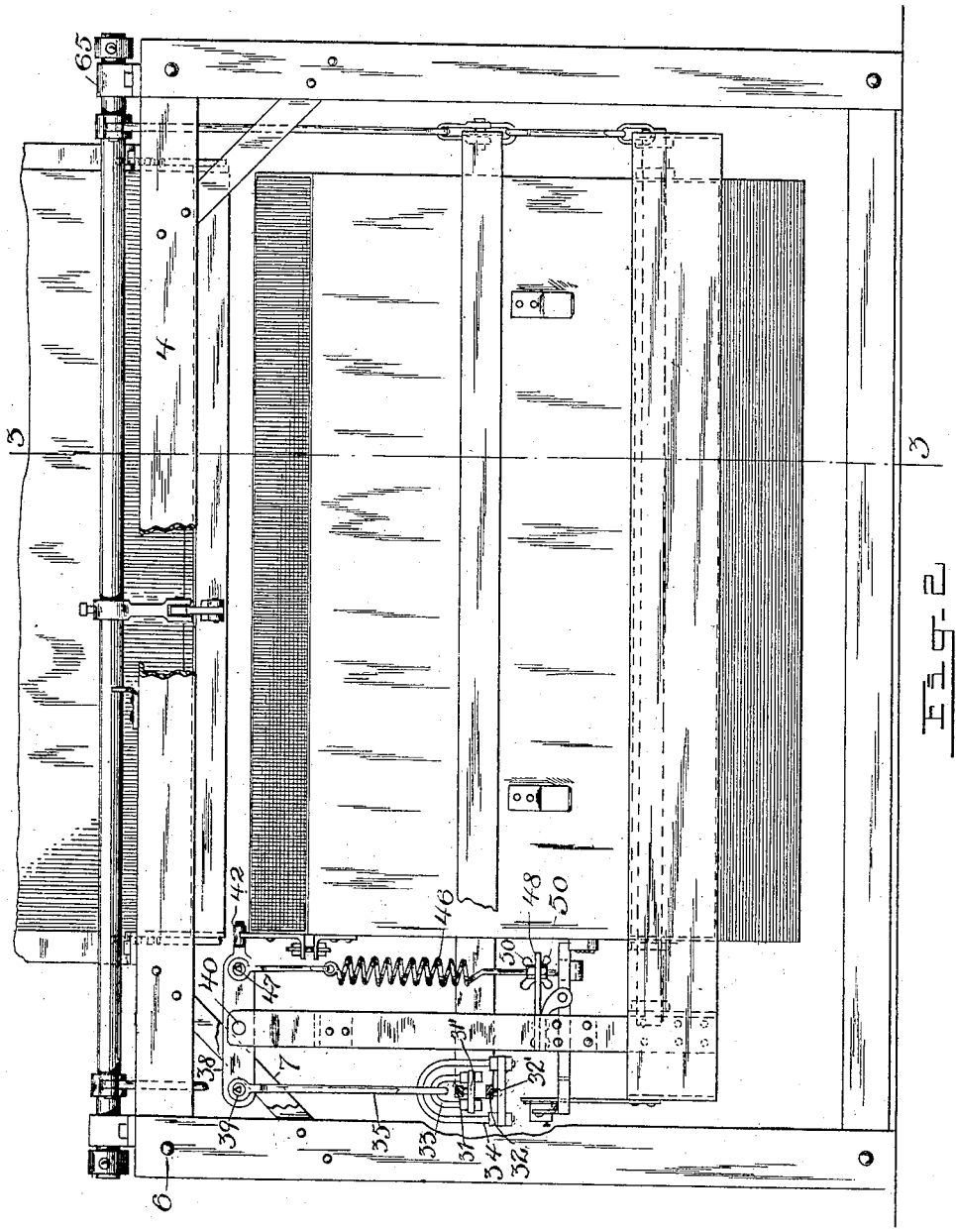
Figure 3:
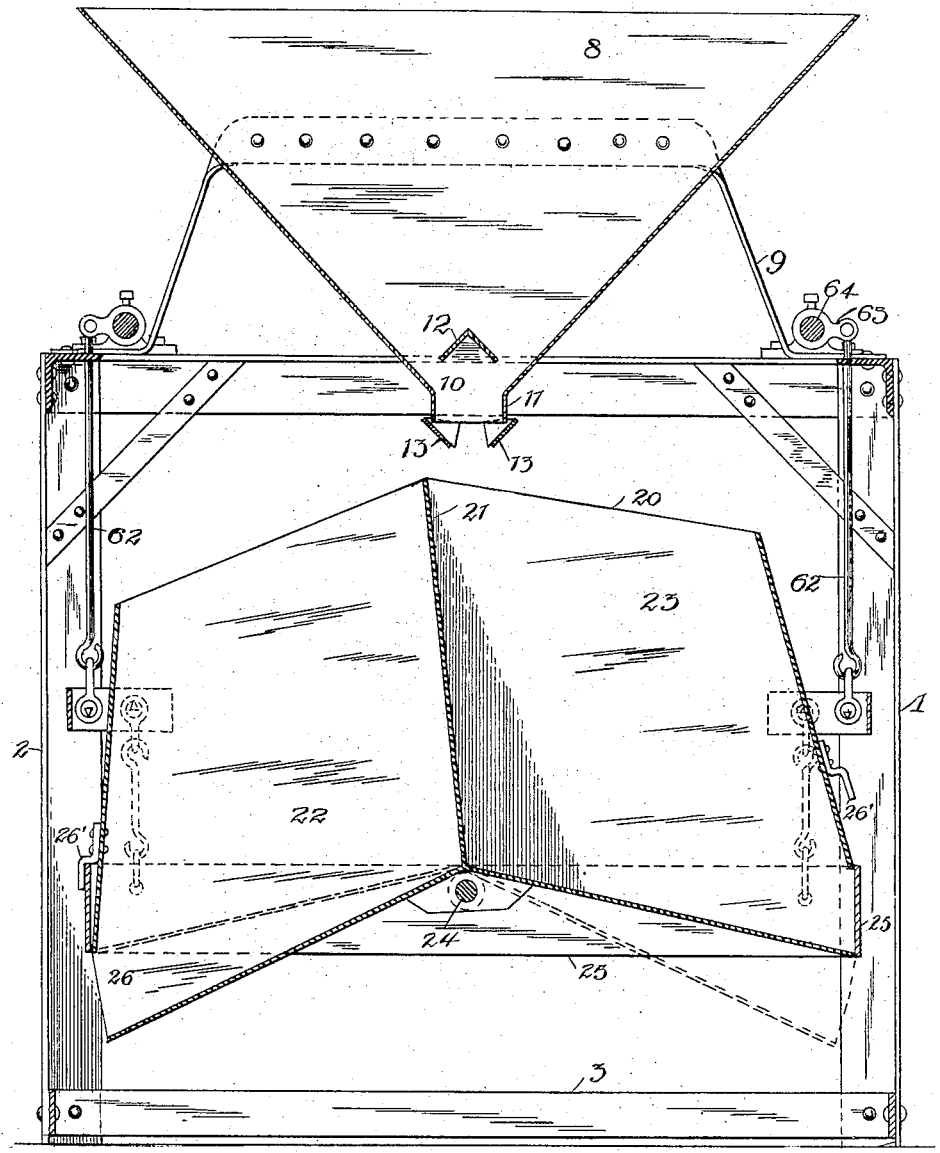
Figure 4:
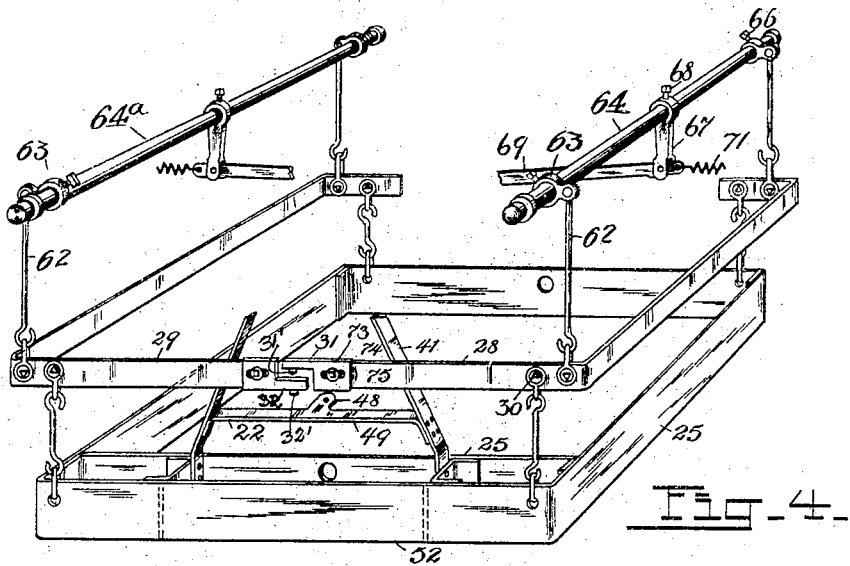
Figures 5, 7:
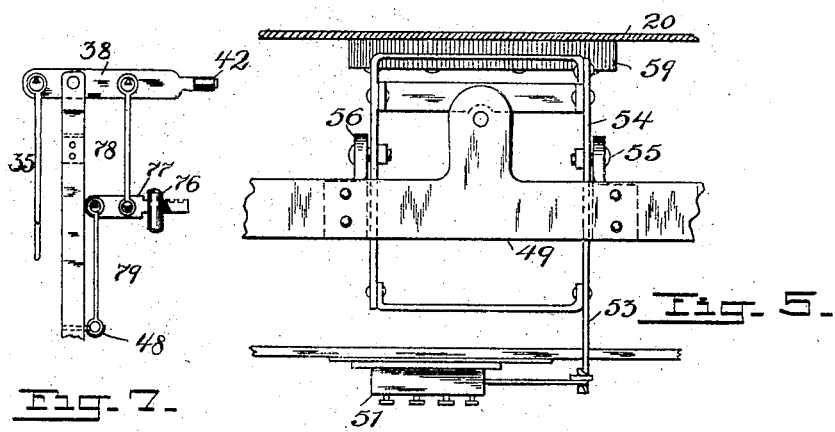
Figure 6:
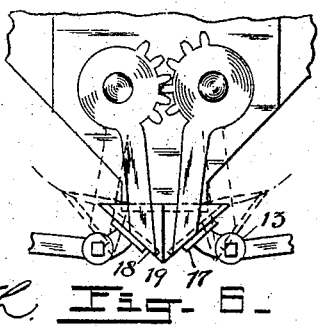

Figure 1 is an end view of the device, a portion of the frame being cut away. Fig. 2 is a side view of the same with portions broken away to better illustrate certain important parts. Fig. 3 is a cross-section taken on the line 3 3 of Fig. 2. Fig. 4 is a perspective view of the frame and rocking shafts upon which the machine is supported. Fig. 5 is a detail plan, drawn on a larger scale, of the registering mechanism. Fig. 6 is a view, on a larger scale, of details of the cut-off mechanism, dotted lines showing the cut-off gates in the open position; and Fig. 7 is a detail view of a modified form of tension device.

In all of the several views like parts are designated by the same reference-numerals.

The device illustrated comprises a frame 1, consisting of vertical members 2 2, lower horizontal members 3, upper horizontal longitudinal members 4, and transverse members 5. These members are all preferably formed of angle-iron, as shown in Fig. 1, and are joined together by rivets 6 and diagonal braces 7 wherever necessary, the whole constituting a rigid framework upon which the other mechanism is supported. A hopper 8, having inclined sides and vertical ends, as shown, is supported from the frame 1 by straps 9 in such a position that its contracted bottom 10 will be continuous with the medial line of the frame. The opening 10 is provided with extension sides 11, so as to form a spout for guiding the escaping material, and above it is an angular cross-piece 12 for diverting the material within the hopper 8 and preventing it from choking the opening 10. The opening 10 may be covered by cut-off gates 13 13, suspended from links 14, pivoted at 15 at the ends of the hopper 8 and so arranged that they may be opened and closed. The pivots 14 are provided with mutilated gear-wheels 16, which intermesh and cause the gates when they move to move synchronously, so that the opening separating their edges will always be below the center of the opening 10. The edges 17 of the cut-off gates 13 abut when the gates are closed, as shown in Fig. 6; but the bottoms 18 of the gates do not extend to a point to cause them to meet when the gates are closed. This produces a narrow opening 19, (when the gates are closed,) through which the material being weighed will constantly pass in a thin sheet or stream.

The weighing bucket or receptacle 20 is divided, by means of a vertical partition 21, into two chambers 22 23 and is supported by means of a shaft 24, arranged at the center of its bottom, so that it may tilt from a position shown in full lines, Fig. 3, to that shown in dotted lines. The shaft of the bucket 20 is supported in a rectangular frame 25, which is deep enough to close the opening 26, which at the time happens to be elevated. As shown, that to the right of Fig. 3 is elevated and closed, and the opening on the opposite side is depressed and opened. When the bucket is tilted, as shown in Fig. 3, the opening at the right will be unmasked by the frame 25 to permit the contents of the chamber 22 to escape. Lugs or buffers 26' 26', carried on the buckets, are arranged to engage with the frame 25 and limit the extent of movement of the bucket. The frame 25 is hung by links 27 from levers 28 and 29. Each of these levers 28 and 29, as shown in Fig. 4, covers a side and half of one of the ends of the bucket. The links 27 are mounted in antifriction devices 30 on the levers 28 29, so as to reduce friction, and therefore increase the accuracy of the machine. The ends of the levers 28 29 overlap, as shown in Fig. 4, each lever having fingers 31 32 so arranged as to lie one over the other. Each finger is provided with a depending portion 31' 32', which engages with yokes 33 34, and the two yokes are supported from a link 35, having openings 36 37 for the passage of the yokes 33 34, respectively. The link 35 is pivoted to a horizontal lever 38 by means of an antifriction device 39. The lever 38 is pivoted at 40 to a vertical extension 41, carried by the frame 25, and is thereby supported. To the other end of the lever 38 is mounted a roller 42, which normally engages within either of the notches 43 or 44, formed upon the upper surface of an arc 45. This arc is carried by the bucket 20, and the roller is kept in engagement normally with one of the notches by means of the spring 46. The lever, roller, and arc constitute a latch for preventing oscillation or tilting of the bucket. The spring 46 engages with the lever 38 by means of an antifriction device 47, and its other end is adjustably secured to a projection 48, carried by a cross-piece 49, riveted in the frame 41. The lower part of the spring 46 is provided with threads, as shown, which are engaged by thumb-nuts 50 on both sides of the projections 48, by means of which the tension of the spring 46 may be adjusted.

A counting device 51, of any suitable type, is carried by member 52 of the frame 25 and is actuated by a rod 53, carried by a frame 54, pivoted at 55 to lugs 56, riveted to the cross-frame 49. The frame 54 is so arranged that it may be engaged by a block 57, carried by the bucket 20, as the latter is tilted upon its shaft 24.

The arc 45 is adjustably supported upon the bucket 20. A suitable means for adjustment consists in providing it with supporting-bolts 58, which pass through slots 59, formed in the arc, and by means of which the arc may be moved up and down at either end, so that the notches 43 and 44 may be adjusted in relation to the roller 42. To assist in this adjustment, adjusting-screws 60 are provided, carried by lugs 61, riveted to the bucket 20.

The levers 28 29 are supported by links 62, journaled upon horizontal cranks 63, adjustably secured to the shafts 64 64ª. These latter shafts are mounted in bearings 65, carried by the frame 1, on each side of the hopper 8. A bolt 66 connects each of the cranks 63 with the shaft 64 and permits of longitudinal and rotary adjustment thereon. Between the cranks 63 63 on each shaft is a crank 67, also secured in place by a bolt 68 to permit adjustment. These cranks 67 are vertical, and each is provided with a link 69, which is connected at 70 to one of the cut-off gates 13. A spring 71 is provided for each of the links 69, so that the gates 13 13 will be normally separated. Each of these springs 71 is provided with an adjusting-nut 72.

In order to adjust the mechanism when it is first used or when in the event of one side of the bucket 20 becoming heavier than the other from wear or other causes and it is not accurately balanced, the extremities of the levers 28 29 are provided with extension-pieces 73, which carry the fingers 31 32. These extension-pieces are provided with slots 74 and bolts 75, by means of which they may be adjusted in relation to the levers 28 29, and the depending portions, which form the pivoting-point, may be moved from the right to the left, or vice versa, until each side of the bucket will weigh the same amount.

The operation of the device is as follows: The material to be weighed, which may be coal, grain, or other material, is deposited in the hopper 8. From there it passes through the opening 10 into one or the other receptacle 22 23 of the bucket as at the time happens to be below the opening 10. As shown in Fig. 3, the chamber 23 happens to be below the opening 10, and this chamber will be first filled, its exit 26 being covered by a portion of the frame 25. As the chamber becomes filled its descending motion will be transmitted to the levers 28 29, and such motion will tilt the said levers upon their links 62, depressing the depending portions 31' 32' and with them the links 35. This movement will tilt the lever 38 against the tension of the spring 46. The spring is so adjusted that when a given weight of material has entered the chamber 23 the lever 38 will be sufficiently tilted to free the roller 42 from engagement with the notch 44 in the arc 45. The engagement of the roller 44 with the notch in the arc 45 up to this time will have prevented the bucket 20 from oscillating on its shaft 24. With the roller 42 free from the notch the bucket will turn upon its shaft, unmasking the opening 26 and permitting the contents of the chamber 23 to be quickly emptied. This movement will bring the chamber 22 to the position below the hopper 8, so that it will be filled therefrom, and the spring 46 will cause the latch to engage within the other notch. The proportion of the size of the openings 10 and 26 is such that each of the chambers will be emptied much quicker than they can be filled, so that the latch will be tripped solely by the weight of the material in one chamber. In oscillating upon its shaft 24 the bucket 20 will move the block 57 into engagement with the frame 54, tilting the latter upon its pivot, and thus actuate the recording mechanism 51. This action will be repeated every time the bucket 20 oscillates upon its shaft 24. When the device is in operation and as one or the other of the chambers 22 23 is becoming filled, the increased pressure upon the links 62 will tend to rotate the shaft 64. This will move the links 69 toward each other in opposition to the pull of the springs 71 and will close the cut-off gates 13. The parts are so proportioned that when either one of the chambers is nearly filled the cut-off gates will be brought into engagement and the material will then be allowed to slowly pass through the opening 19. By this means extreme accuracy in the operation of the device is secured, as any tendency of the latch to be prematurely sprung by the momentum of the parts, owing to uneven feed of material into the hopper, will be overcome. Each chamber will be nearly filled very quickly; but as the spring 35 is about to be counterbalanced the gates will assume a closed position, and as the stream of material entering its hopper is very thin the parts will gradually move and irregular feed of material into the hopper will have no effect to cause irregularity of movement of the latch. This mechanism has a further advantage in that when the gates are closed such a small amount of material is passing from the hopper to the bucket in the air between the two that when the latch is sprung and the bucket oscillates the amount of material which may be deposited in the wrong chamber will be so small as not to affect the general result of the weighing operation.

Instead of using a spring 35 it may be combined with a weight, or the spring may not be used and a weight may take its place. Fig. 7 shows how a weight may be employed. The weight 76 is adjustably carried by a rod 77, which is pivoted to links 78 and 79 between the lever 38 and the frame 48 in such a manner that the weight will tend to depress the roller 47.

Having now described my invention, what I claim as new, and desire to secure by Letters Patent, is—

1. In a weighing-machine, the combination with a hopper and a gate for controlling the discharge thereof, of a receptacle arranged to receive from the hopper-discharge, the said receptacle being pivotally mounted so that it may empty when filled, a lock for preventing oscillation of the receptacle, and connections between the receptacle and gate for gradually closing the latter as the receptacle becomes filled.

2. In a weighing-machine, the combination with a hopper, a gate therefor for controlling the discharge therefrom, a receptacle arranged to receive from the hopper-discharge, a pivotal mounting for the receptacle to permit it to oscillate and empty when filled, and a lock for preventing oscillation of the receptacle, a supporting-arm for the receptacle, and connections between the arm and the gate for gradually closing the latter as the receptacle becomes filled and means for opposing the closing of the gate.

3. In a weighing-machine, the combination with a hopper and means for controlling its discharge, of a receptacle adapted to receive from the hopper-discharge, means for emptying the receptacle after a predetermined weight of material has been deposited within it, and means connecting the receptacle and the hopper-discharge-controlling means, for gradually reducing the discharge from the hopper as the receptacle becomes filled.

4. In a weighing-machine, the combination with a hopper and means for controlling the discharge therefrom, of a receptacle arranged to receive from the hopper-discharge, the said receptacle being pivotally mounted so that it may empty when filled, a lock for preventing oscillation of the receptacle and means connecting the receptacle and the hopper-discharge-controlling means, for gradually reducing the discharge from the hopper as the receptacle becomes filled.

5. In a weighing-machine, the combination with a hopper and a gate therefor for controlling its discharge, a receptacle arranged to receive from the hopper-discharge, means for emptying the receptacle after it has received a predetermined weight of material from the hopper, a latch for preventing emptying of the receptacle, a lever supporting the receptacle and connected to the latch and spring-controlled connections between the lever and the gate for gradually closing the latter as the receptacle becomes filled.

6. In a weighing-machine, the combination with a hopper and a gate for controlling the discharge therefrom, of a spring-supported receptacle and connections between the receptacle and the gate for gradually closing the latter as the receptacle becomes filled and the spring becomes extended, and means for emptying the receptacle when filled with a predetermined weight of material.

7. In a weighing-machine, the combination with a hopper and discharge-controlling gate, of a lever, one end of which is supported by a spring and connected to the gate, a receptacle mounted upon the lever, whereby the gate will be gradually closed as the receptacle becomes filled, a lock for preventing emptying of the receptacle, the other end of the lever being connected to the lock, and a spring, the said lock being moved against the tension of the spring.

8. In a weighing-machine, the combination with a hopper, gates thereon, a pivoted receptacle, a weighing device moving with the receptacle, and means for supporting the receptacle, such means being connected to the gates for closing the latter by the descent of the receptacle and locking means for controlling the oscillation of the receptacle, the said locking means being controlled by the weighing device.

9. In a weighing-machine, the combination with a hopper, gates thereon, a pivoted receptacle, a weighing device moving with the receptacle, and means for supporting the receptacle, such means being connected to the gates for closing the latter by the descent of the receptacle, the said gates being so constructed and arranged that when closed the outlet of the hopper will be partially open, and locking means for controlling the oscillation of the receptacle, the said locking means being controlled by the weighing device.

10. In a weighing-machine, the combination with a hopper, gates thereon for controlling the outlet thereof, a receptacle below the hopper, the said receptacle having a plurality of compartments, and being so pivoted as to move to bring its compartments successively below the outlet of the hopper, means for permitting the receptacle to oscillate and independent means for supporting the receptacle, the supporting means being connected to the gates for closing the latter, as a compartment in the receptacle becomes filled.

11. In a weighing-machine, the combination with a hopper and a pivoted receptacle, having a plurality of compartments, means for supporting the receptacle to permit it to oscillate and bring the compartments successively below the outlet of the hopper, a lock for preventing oscillation and means for controlling the lock to release it after a predetermined weight of material has entered a compartment, gates for closing the outlet of the opening, and connections independent of the lock-controlling means for gradually closing the gates as the hopper becomes filled.

12. In a weighing-machine, the combination with a hopper and a pivoted receptacle having a plurality of compartments, means for supporting the receptacle to permit it to oscillate and bring the compartments successively below the outlet of the hopper, a lock for preventing oscillation and means for controlling the lock to release it after a predetermined weight of material has entered a compartment, gates for closing the outlet of the opening, and connections independent of the lock-controlling means for gradually closing the gates as the hopper becomes filled, the said gate-actuating mechanism being moved by the descent of the receptacle.

13. In a weighing-machine, the combination with a hopper having a discharge-opening, of a receptacle below the same, shafts, means connecting the receptacle to the shafts so that the weight of the receptacle and its contents will tend to rotate the shafts, pivoted gates for controlling the hopper-opening, and connections between the shafts and gates for closing the latter as the receptacle becomes filled.

14. In a weighing-machine, the combination with a frame, of a tilting receptacle suspended thereon, the said receptacle carrying an arc provided with notches, and a lever engaging with a notch, means actuated by the weight of the material being weighed to disengage the lever and permit the tilting of the bucket, and means for adjusting the arc in relation to the lever.

15. In a weighing-machine, the combination with a frame, of a tilting receptacle suspended thereon, the said receptacle carrying an arc provided with notches, and a lever carrying a roller, engaging with a notch, means actuated by the weight of the material being weighed to disengage the roller and permit the tilting of the bucket, and means for adjusting the arc in relation to the roller.

16. In a weighing-machine, the combination with a frame, a receptacle pivoted thereon, levers supporting the frame, the free ends of the levers being adjacent, a common support for the free ends of the levers, and means for adjusting the point of support toward or away from the pivoting-point of one of the levers.

17. In a weighing-machine, the combination with a hopper having a discharge-opening and gates, of a receptacle below the hopper, shafts carrying arms upon which the receptacle is supported and which tends to rotate the shafts, additional arms upon the shafts, connections between these arms and the gates, and means for adjusting the angularity of the arms.

This specification signed and witnessed this 8th day of June, 1904.

EWAN CAMERON.

Witnesses:
JOHN H. LINDSAY,
FRANK F. SCHULZ.